(No Model.)
J. A. DICUS.
MACHINE FOR CUTTING TEETH UPON SAW AND OTHER SIMILAR BLANKS.
No. 341,461. Patented May 11, 1886.
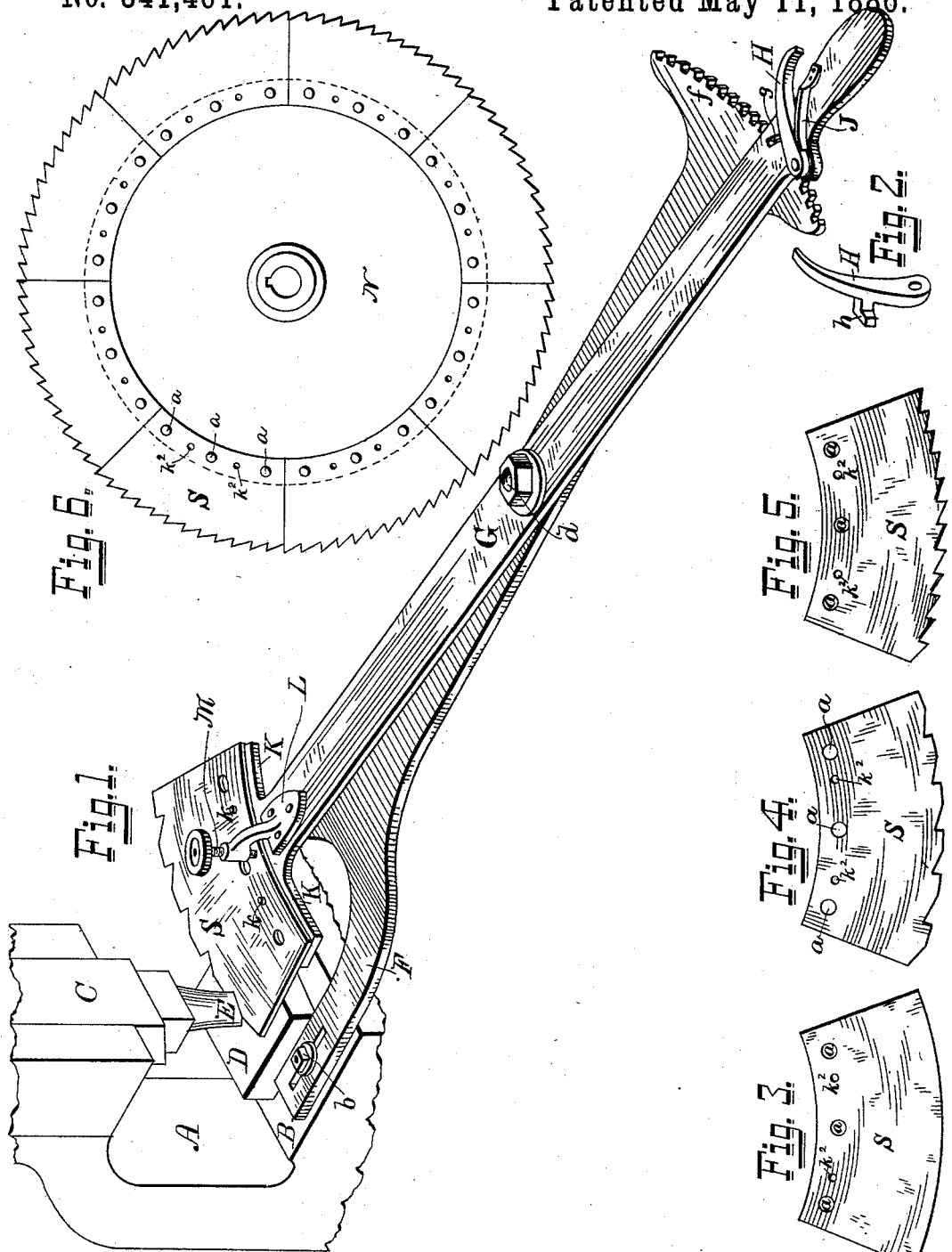
Witnesses:
Oscar E. Perrigo
W. H. Bevitt
Inventor:
James A. Dicus

UNITED STATES PATENT OFFICE.

JAMES A. DICUS, OF SPRINGFIELD, OHIO, ASSIGNOR TO WILLIAM N. WHITELEY, OF SAME PLACE.

MACHINE FOR CUTTING TEETH UPON SAW AND OTHER SIMILAR BLANKS.

SPECIFICATION forming part of Letters Patent No. 341,461, dated May 11, 1886.

Application filed December 17, 1885. Serial No. 185,926. (No model.)

*To all whom it may concern:*

Be it known that I, JAMES A. DICUS, a citizen of the United States, residing in Springfield, in the county of Clark and State of Ohio, have invented certain new and useful Improvements in Mechanisms for Forming Teeth Upon Milling and Sawing Tools, of which the following is a specification, reference being had to the accompanying drawings hereunto attached and forming a part thereof.

My invention relates to machines for punching or gumming saw-teeth or mills for cutting metals, and for other purposes, wherein such saws or mills are made of sheet metal, more especially when said saws or mills are made in segmental sections to be attached to a central disk, hub, wheel, plate, or spider; and it consists in the apparatus hereinafter described, whereby the saw is held and presented to the gumming-punch. It is immaterial whether the saw is constructed of a single piece or in segmental sections fixed upon a central disk, hub, wheel, plate, or spider.

The objects of my invention are to form said teeth quickly, cheaply, and efficiently, and to provide such simple and accurate mechanical devices for holding and cutting said teeth that they may be accurately cut when the blank plate is first used, and also, after the teeth are worn, the temper may be withdrawn from the plate and the teeth recut, which operation may be repeated until all the available portion of the plate is exhausted.

I have used saws made by my mode and the machinery, as hereinafter more particularly described, for cutting the slot through which the knife-sections slide in the guards or fingers of harvesting-machines; but the same would be available for the cutting of teeth in mills or saws used for many other purposes which will readily suggest themselves to one skilled in the art.

The mechanical devices by which I accomplish the objects herein stated are fully illustrated in the drawings, in which—

Figure 1 is a perspective view of my device for holding the segmental plates or blanks for cutting. Fig. 2 is a perspective view of the radius-arm pawl. Fig. 3 is a view of one of the segmental-plate blanks before the teeth are cut. Fig. 4 is a similar view when every alternate tooth is cut. Fig. 5 is a view of the same when all the teeth are cut and ready to be attached to the disk. Fig. 6 is a view, on a reduced scale, of a complete saw having all the segmental plates fixed in place on the central disk.

Similar letters refer to like parts in the several views.

A is the body of an ordinary punching-press, B the bed, C the plunger, D the die, and E the punch thereof.

To the bed of the press is fixed the forked bar F by the bolt $b$, (and a similar one on the opposite side, not shown.) Upon the opposite end of the bar F is formed a segment, $f f$, having teeth formed thereon, as shown.

Pivoted to the bar F at $d$ is the radius-arm G, provided with a pawl or catch-lever, H, pivoted to it, which has formed upon it the right-angled projection $h$, which passes through the slot $g$ in the radius-arm G and engages the teeth of the segment $f$, and is held therein by the spring J. Upon the opposite end of the radius-arm G are formed lateral projections K K, in which are fixed the "steady-pins" $k\ k$, fitting into the holes $k^2\ k^2$ in the segmental plate to be operated upon. (See Figs. 3, 4, and 5.) Fixed to the top of the radius-arm G, near the lateral projections K K, is the upright bracket L, through which passes the compression-screw M.

The operation of my device is as follows, viz: The blank plates are formed as shown at S, Fig. 3, having the holes $a\ a\ a$ for attaching to the disk N, and the holes $k^2\ k^2$ for the steady-pins $k\ k$. The plate S is placed upon the lateral projections K K of the radius-arm G in the position shown, the steady-pins $k\ k$ projecting into the holes $k^2\ k^2$, the compressing-screw M is screwed tightly down upon the plate S, holding it firmly in place. The forked supporting-arm F, with the radius-arm G and plate S attached, is now moved up to such a point that the punch E will form a tooth of the proper depth when the nut $b$ and its fellow are tightened up, holding the device in its place in relation to the punching-press. The radius-arm G is now placed in the position as shown in Fig. 1 and held by the pawl H, engaging in the teeth of the segment $f$, and a space punched out of the plate. The radius-arm G is then moved the space of two teeth, (turning on the pivot-bolt $d$,) the projection $h$ of the pawl H falling into the second notch from where it last rested in the segment $f$, and another space punched out, leaving a space between it and the last cut sufficiently wide for one space. The operation is then repeated until every alternate tooth is formed, the plate appearing as shown in Fig. 4. The screw M is then loosened, the plate S removed and turned over, adjusted on the steady-pins $k\ k$, clamped by the compressing-screw M, and the punch E changed for one facing in the opposite direction, and the operation repeated, punching the spaces left by the first operation and completing the plate, as shown in Fig. 5. When the teeth of these segmental saws are worn so as to be unfit for further use, the temper is withdrawn, and the sections being placed upon the radius-arm G, the bolt $b$ and its fellow are loosened, and the whole device set nearer the punch, so as to recut the teeth when the bolt $b$ and its fellow are tightened, the plates recut, and as each section is an exact counterpart of the other as to number and depth of teeth, radius of outer circle, &c., it is practically as good as new.

I find in practice that the teeth of saws or mills cut by my method wear much longer and do as good work as those cut by a milling-machine, and the teeth require no filing or other sharpening, but are tempered in the condition they come from the punch and used with no grinding or preliminary operations of any kind.

In practice, where a large number of plates are to be cut, they are all punched to the condition shown in Fig. 4, after which, the punch being changed, they are turned over and the punching completed.

In place of changing the punch when the plates are turned over, the punch may be made with a right-hand form on its front side and a left-hand form on the back, so that the same punch may be turned half-way round, instead of having separate right and left hand punches.

The spacing of the teeth in the saw will bear the same proportion to the spacing of the notches in the segment $f$ as the distance from the segment $f$ to the pivot-bolt $d$ is to the distance from the pivot-bolt $d$ to the punch E.

When a sufficient number of segmental plates are made to form a circle, they are riveted or otherwise fixed to a central disk, as shown in Fig. 6.

Circular saws or mills all in one piece may have their teeth formed upon them by my device by simply modifying the holding device by pivoting upon the pivot-bolt $d$ or its equivalent, an index-plate upon which the saw is fixed by any convenient means, the holes in the index-plate determining the number of teeth, &c.

Having thus fully described my invention, which I wish to secure by Letters Patent, I claim—

1. The forked supporting-bar F, adjustably connected to the bed of a punching-press having a segment, $f$, formed thereon, and a radius-bar pivoted thereto, in combination with the radius-bar G, pivoted to the supporting-bar F, and being provided with a pawl, H, engaging the teeth of the segment $f$, while upon its opposite end is formed a suitable receptacle for the blank plate S, and provided with a compression-screw for clamping said plate, all constructed, arranged, and operating substantially in the manner and for the purposes herein shown and described.

2. The forked supporting-bar F, provided with the segment $f$, and having the radius-bar G pivoted thereto, the radius-bar G, pivoted to the supporting-bar F, and being provided with a pivoted pawl, H, at one end and at the other with the lateral projecting arms K K, and compressing-screw M, in combination with a punching-press provided with a punch and die for punching the teeth of saws or mills, all constructed, arranged, and operating substantially in the manner and for the purposes shown and described.

JAMES A. DICUS.

Witnesses:
 OSCAR E. PERRIGO,
 W. F. BEVITT.